United States Patent
Kawano et al.

(10) Patent No.: US 10,872,245 B2
(45) Date of Patent: Dec. 22, 2020

(54) ROAD PARAMETER CALCULATOR

(71) Applicant: DENSO CORPORATION, Kariya (JP)

(72) Inventors: Taiki Kawano, Aichi-pref. (JP); Naoki Kawasaki, Aichi-pref. (JP); Shunsuke Suzuki, Aichi-pref. (JP); Shunya Kumano, Aichi-pref. (JP)

(73) Assignee: DENSO CORPORATION, Kariya (JP)

( * ) Notice: Subject to any disclaimer, the term of this patent is extended or adjusted under 35 U.S.C. 154(b) by 337 days.

(21) Appl. No.: 15/944,192

(22) Filed: Apr. 3, 2018

(65) Prior Publication Data

US 2018/0293447 A1 Oct. 11, 2018

(30) Foreign Application Priority Data

Apr. 5, 2017 (JP) .................. 2017-075015

(51) Int. Cl.
| | | |
|---|---|---|
| G06K 9/00 | (2006.01) | |
| G06T 7/12 | (2017.01) | |
| G06T 7/277 | (2017.01) | |
| G06T 7/73 | (2017.01) | |
| G06K 9/46 | (2006.01) | |

(52) U.S. Cl.
CPC ....... *G06K 9/00798* (2013.01); *G06K 9/4604* (2013.01); *G06T 7/12* (2017.01); *G06T 7/277* (2017.01); *G06T 7/73* (2017.01); *B60W 2552/05* (2020.02); *B60W 2552/20* (2020.02); *G06T 2207/20061* (2013.01); *G06T 2207/20076* (2013.01); *G06T 2207/30256* (2013.01)

(58) Field of Classification Search
CPC .... G06K 9/00798; G06K 9/4604; G06T 7/73; G06T 7/12; G06T 7/277; G06T 2207/20076; G06T 2207/30256; G06T 2207/20061; B60W 2552/05; B60W 2552/20

See application file for complete search history.

(56) References Cited

U.S. PATENT DOCUMENTS

| | | | | |
|---|---|---|---|---|
| 8,655,023 | B2 * | 2/2014 | Otuka ................ | G06K 9/00798 382/104 |
| 10,071,738 | B2 * | 9/2018 | Upmanue ............. | G08G 1/167 |
| 2002/0042668 | A1 * | 4/2002 | Shirato .............. | G06K 9/00798 701/1 |
| 2002/0042676 | A1 * | 4/2002 | Furusho .............. | G06K 9/4609 701/300 |
| 2005/0225477 | A1 * | 10/2005 | Cong ................... | G01S 13/723 342/70 |

(Continued)

*Primary Examiner* — Bobbak Safaipour
(74) *Attorney, Agent, or Firm* — Maschoff Brennan

(57) ABSTRACT

A road parameter calculator is provided which is equipped with an edge-point extracting unit, a road parameter calculating unit, a gradient detecting unit, and a modeling unit. The image acquiring unit. The edge-point extracting unit extracts edge points from an image of a frontal view of a vehicle. The parameter calculating unit calculates a road parameter using the edge points through a Kalman filter. The gradient detecting unit detects a change in gradient of the road in front of the vehicle. The modeling unit is responsive to a change in gradient to make a model as extending more straight than when the change in gradient is not detected. This minimizes adverse effects of the change in gradient of the road on the calculation of the road parameter.

27 Claims, 8 Drawing Sheets

FIG.3(a)

(56) References Cited

U.S. PATENT DOCUMENTS

| | | | |
|---|---|---|---|
| 2008/0201038 A1* | 8/2008 | Jung | B60T 8/172 |
| | | | 701/41 |
| 2010/0189306 A1* | 7/2010 | Kageyama | G06K 9/00798 |
| | | | 382/104 |
| 2012/0185167 A1 | 7/2012 | Higuchi et al. | |
| 2014/0067153 A1* | 3/2014 | Yu | B60W 40/076 |
| | | | 701/1 |
| 2014/0067154 A1* | 3/2014 | Yu | B60W 40/076 |
| | | | 701/1 |
| 2015/0055831 A1* | 2/2015 | Kawasaki | G06K 9/4638 |
| | | | 382/104 |
| 2015/0269445 A1* | 9/2015 | Ueda | B60R 1/00 |
| | | | 348/118 |
| 2016/0304120 A1* | 10/2016 | Okada | G06K 9/00798 |
| 2018/0047147 A1* | 2/2018 | Viswanathan | G06T 7/269 |
| 2018/0204074 A1* | 7/2018 | Kumano | G06T 7/12 |
| 2018/0286051 A1* | 10/2018 | Suzuki | G06K 9/00798 |
| 2019/0100201 A1* | 4/2019 | Kumano | B60W 60/0053 |
| 2019/0375407 A1* | 12/2019 | Maleki | B60W 10/04 |
| 2020/0216076 A1* | 7/2020 | Otto | G06K 9/00798 |

\* cited by examiner

ROAD PARAMETER CALCULATOR

CROSS REFERENCE TO RELATED DOCUMENT

The present application claims the benefit of priority of Japanese Patent Application No. 2017-75015 filed on Apr. 5, 2017 the disclosure of which is incorporated herein by reference.

BACKGROUND

1 Technical Field

The invention relates generally to a road parameter calculator.

2 Background Art

Japanese Patent First Publication No. 2011-28659 (corresponding to US 2012/0185167 A1 assigned to Hitachi Automotive Systems ltd., disclosure of which is incorporated herein by reference) teaches a road parameter calculator designed to capture an image of a forward view from a vehicle using an in-vehicle camera, detect edge points on the captured image, and calculate a road parameter using the edge points by means of a Kalman filter.

There may be a change in gradient of a road in front of the vehicle. This results in a difficulty in calculating the road parameter correctly. For instance, when a lane line on the road is actually straight, it may be determined as being a curved line due to the gradient of the road.

SUMMARY

It is an object of this disclosure to provide a road parameter calculator which minimizes adverse effects of a change in gradient of a road on calculation of a road parameter.

According to one aspect of this disclosure, there is provided a road parameter calculator which comprises: (a) an image acquiring unit which is configured to acquire an image of a forward view of a vehicle; (b) an edge-point extracting unit which is configured to extract edge points from the image derived by the image acquiring unit; (c) a road parameter calculating unit which is configured to calculate a road parameter through a Kalman filter using the edge points derived by the edge-point extracting unit; (d) a gradient detecting unit which is configured to detect a change in gradient of a road in front of the vehicle; and (f) a modeling unit which is configured to produce a model in the Kalman filter, when the gradient detecting unit detects the change in gradient. The modeling unit works to produce the model which models a road extending more straight than when the gradient change is not detected.

The road parameter calculator is capable of minimizing adverse effects of the change in gradient of the road on calculation of the road parameter.

According to the second aspect of this disclosure, there is provided a road parameter calculator which comprises: (a) an image acquiring unit which is configured to acquire an image of a forward view of a vehicle; (b) an edge-point extracting unit which is configured to extract edge points from the image derived by the image acquiring unit; (c) a road parameter calculating unit which is configured to calculate a road parameter through a Kalman filter using the edge points derived by the edge-point extracting unit; (d) a gradient detecting unit which is configured to detect a change in gradient of a road in front of the vehicle; and (e) an edge-point limiting unit which is configured to define a range in which the edge points are used by the road parameter calculating unit to lie closer to the vehicle when the gradient detecting unit detects the change in gradient than when the gradient detecting unit does not detect the change in gradient.

The road parameter calculator in the second aspect is capable of minimizing adverse effects of the change in gradient of the road on calculation of the road parameter.

According to the third aspect of this disclosure, there is provided a road parameter calculator which comprises: (a) an image acquiring unit which is configured to acquire an image of a forward view of a vehicle; (b) an edge-point extracting unit which is configured to extract edge points from the image derived by the image acquiring unit; (c) a road parameter calculating unit which is configured to calculate a road parameter through a Kalman filter using the edge points derived by the edge-point extracting unit; (d) a gradient detecting unit which is configured to detect a change in gradient of a road in front of the vehicle; and (e) an edge-point limiting unit which is configured to define a right and a left range in which the edge points on a right and a left lane line are used by the road parameter calculating unit. The right and left lane lines are lines on the image which define a road on which the vehicle is currently located. When the gradient detecting unit detects the change in gradient, the edge-point limiting unit sets the right and left ranges to be equal to each other.

The road parameter calculator in the third is capable of minimizing adverse effects of the change in gradient of the road on calculation of the road parameter.

According to the fourth aspect of this disclosure, there is provided a road parameter calculator which comprises: (a) an image acquiring unit which is configured to acquire an image of a forward view of a vehicle; (b) an edge-point extracting unit which is configured to extract edge points from the image derived by the image acquiring unit; (c) a road parameter calculating unit which is configured to calculate a road parameter through a Kalman Kalman filter using the edge points derived by the edge-point extracting unit; (d) a gradient detecting unit which is configured to detect a change in gradient of a road in front of the vehicle; (e) a lane line producing unit which is configured to produce a lane line using the edge points derived by the edge-point extracting unit; (f) a likelihood calculating unit which is configured to calculate a likelihood that the lane line, as derived by the lane line producing unit, is a branch line using at least one of a curvature, a yaw angle, and an offset of the vehicle lane line; (g) a branch line determining unit which is configured to determine that the lane line represents the branch line when the likelihood, as derived by the likelihood calculating unit, is greater than a given threshold value; (h) an edge-point removing unit which is configured to remove ones of the edge points which define the lane line, as determined by the branch line determining unit as being the branch line, from a range in which the edge points are used by the road parameter calculating unit; and (i) a threshold determining unit which is configured to increase the threshold used when the gradient detecting unit detects the change in gradient to be greater than that when the gradient detecting unit does not detect the change in gradient.

This minimizes an error in determining that the lane line is the branch line when there is the change in gradient, thereby ensuring the stability in calculating the road parameter correctly regardless of the change in gradient in front of the vehicle.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENT

An embodiment of this disclosure will be described below with reference to the drawings.

1 Structure of Road Parameter Calculator

Figure 1:
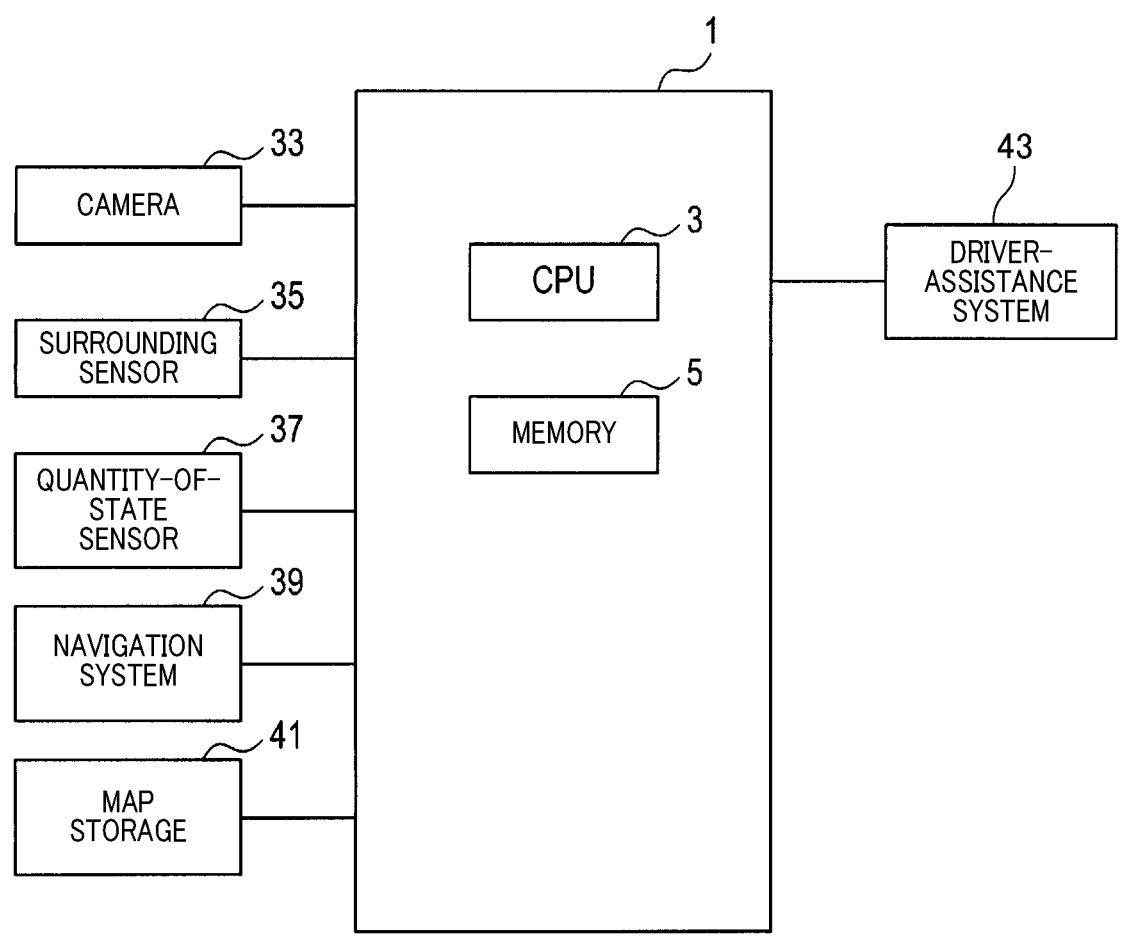
FIG. 1 is a block diagram which illustrates a road parameter calculator according to an embodiment.
Figure 2:
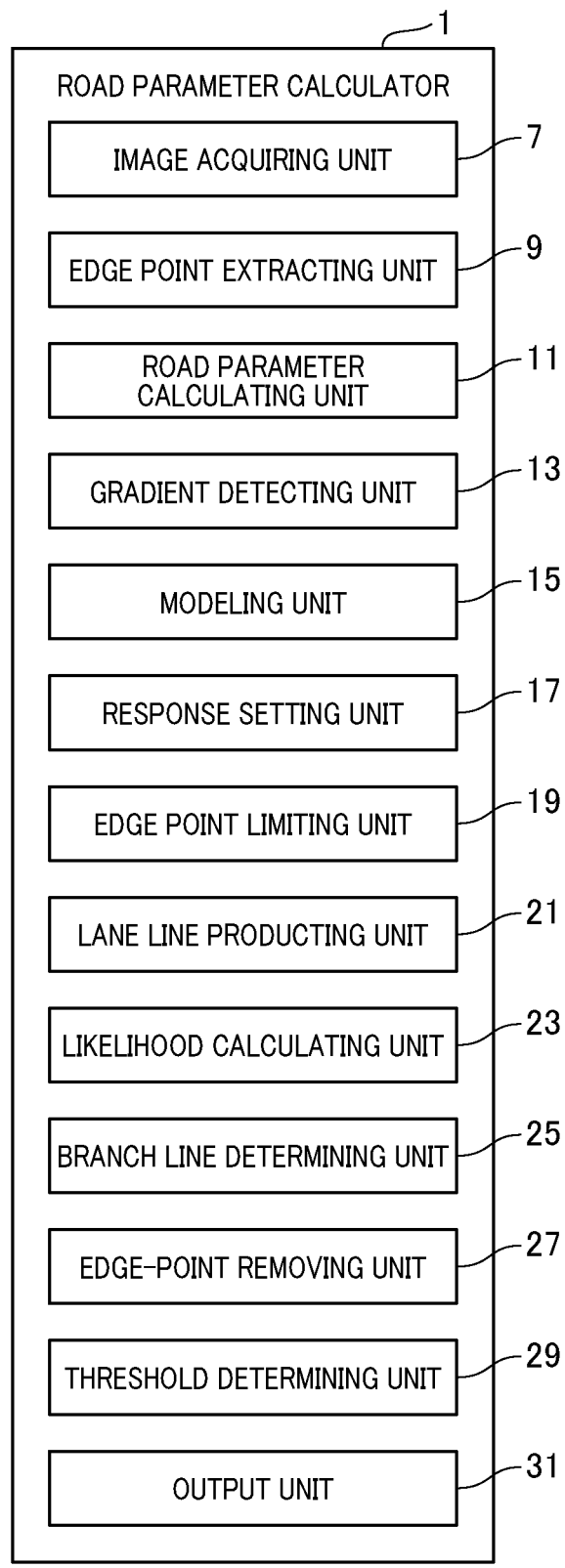
FIG. 2 is a block diagram which illustrates a functional structure of the road parameter calculator of FIG. 1.

Referring to FIGS. 1 and 2, there is shown the road parameter calculator 1. The road parameter calculator 1 is a vehicle-mounted system which is installed in a vehicle such as an automobile. In the following discussion, the vehicle equipped with the road parameter calculator 1 will also be referred to as a system-equipped vehicle.

The road parameter calculator 1 is made of a known microcomputer equipped with a CPU 3 and a semiconductor memory 5 which includes, for example, a RAM, a ROM, and a flash memory. The road parameter calculator 1 has a variety of functions which are achieved by executing programs, as stored in a non-transitory tangible storage media, using the CPU 3. In this embodiment, the memory 5 is the non-transitory tangible storage media. The programs are executed to perform given sequences of steps. The road parameter calculator 1 may be implemented by one or more microcomputers.

The road parameter calculator 1, as illustrated in FIG. 2, includes the image acquiring unit 7, the edge-point extracting unit 9, the road parameter calculating unit 11, the gradient detecting unit 13, the modeling unit 15, the response setting unit 17, the edge-point limiting unit 19, the lane line producing unit 21, the likelihood calculating unit 23, the branch line determining unit 25, the edge-point removing unit 27, the threshold determining unit 29, and the output unit 31 as units which execute the programs in the CPU 3 of the road parameter calculator 1 to achieve the functions. The above elements which perform all or some of the functions of the road parameter calculator 1 do not need to be realized by software, but may be made using one or more hardware devices. For instance, in a case where the above functions are created by hardware electronic circuits, the electronic circuits may be made of digital circuits equipped with many logical circuits, analog circuits, or a combination thereof.

The system-equipped vehicle is, as illustrated in FIG. 1, equipped with the camera 33, the surroundings sensor 35, the quantity-of-vehicle state sensor 37, the navigation system 39, the map information storage 41, and the driver-assistance system 43 in addition to the road parameter calculator 1.

The camera 33 captures an image of a view in front of the system-equipped vehicle and output it to the road parameter calculator 1 as representing a forward view of the system-equipped vehicle. The location and orientation of the camera 33 are always fixed relative to the system-equipped vehicle. The surroundings sensor 35 detects an object, such as another vehicle, a pedestrian, or a feature (also called a landmark), around the system-equipped vehicle. The surroundings sensor 35 is also capable of measuring the configuration of a surface of a road on which the system-equipped vehicle is moving. The quantity-of-vehicle state sensor 37 works to measure the quantity of state of the system-equipped vehicle. For instance, the quantity-of-vehicle state sensor 37 measures the speed, the acceleration, or the yaw rate of the system-equipped vehicle.

The navigation system 39 determines the location of the system-equipped vehicle using a GPS. The map information storage 41 stores map information therein. The map information includes information about gradients of given locations on the map. The driver-assistance system 43 works to perform a known driver-assistance operation, such as a lane-keeping assist operation, using a road parameter, as calculated by the road parameter calculator 1. The road parameter, as used in this embodiment, is a parameter representing the configuration of a road, such as a straight or a curved road, on which the system-equipped vehicle is positioned.

2 Operation Executed by Road Parameter Calculator

Operations cyclically executed at a given interval by the road parameter calculator 1 will be described below with reference to FIGS. 3 to 6.

Figure 3A:
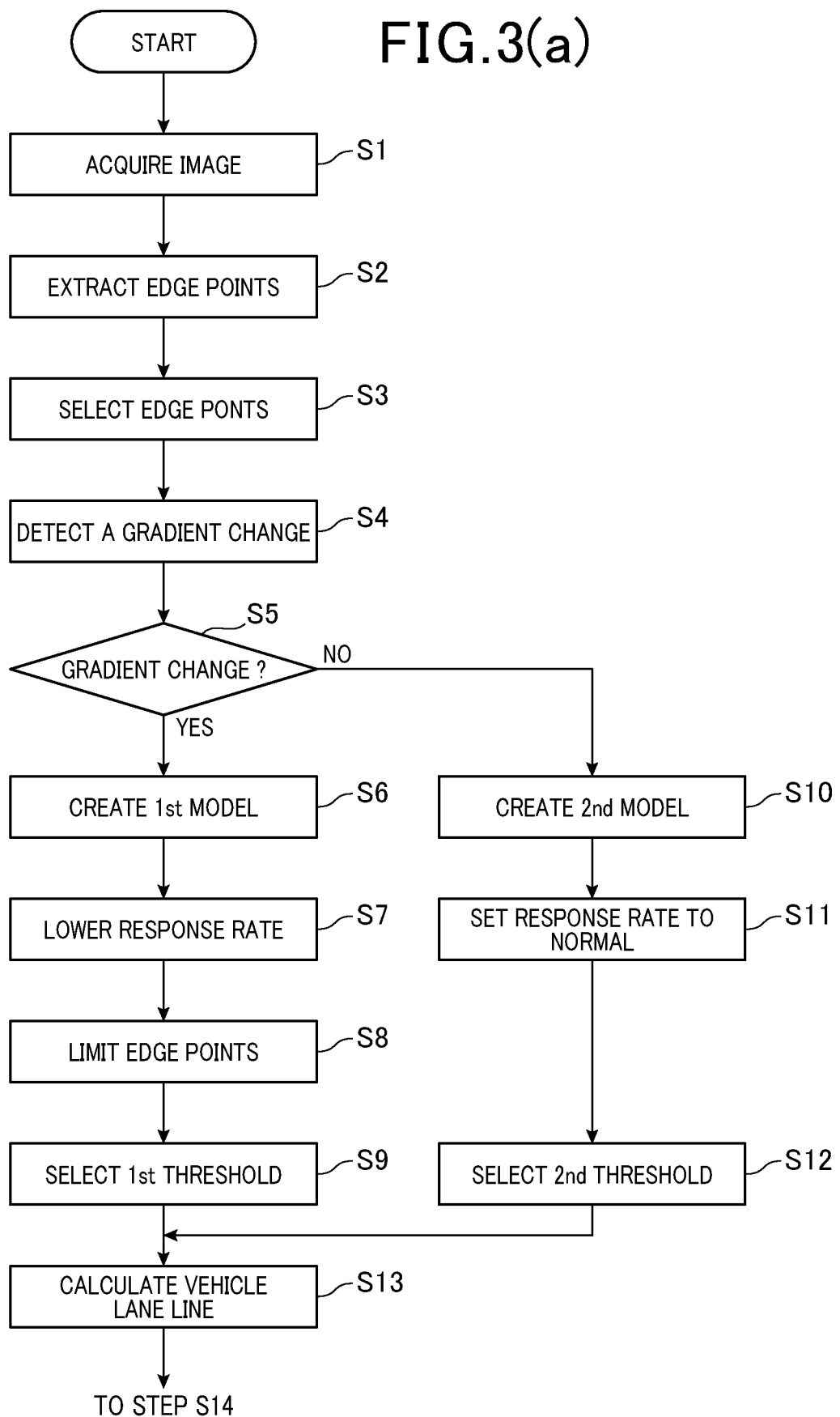
FIGS. 3(a) and 3(b) are a flowchart of a program executed by a road parameter calculator according to an embodiment.
Figure 3B:
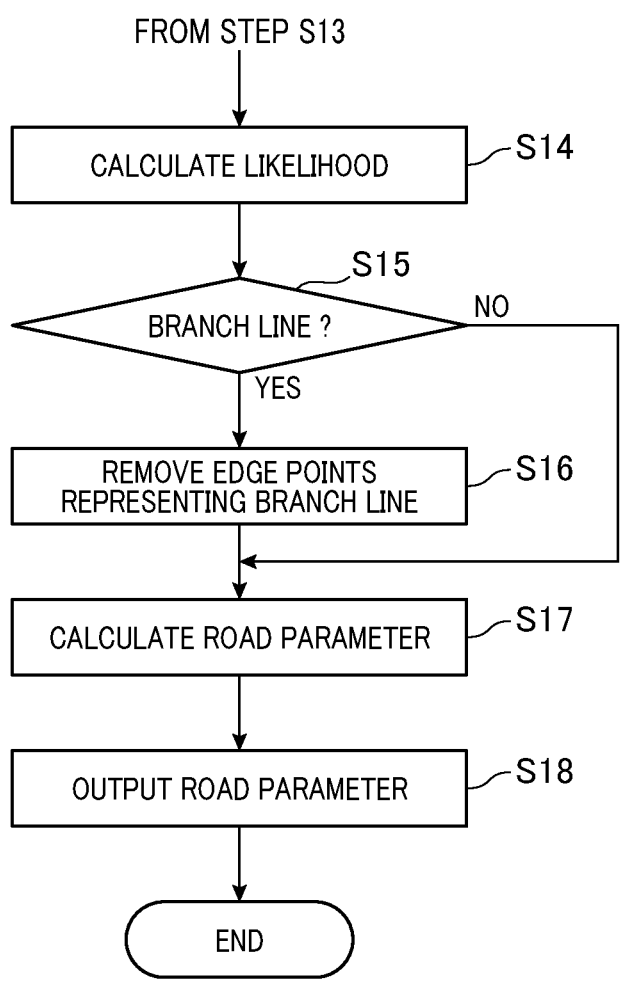

FIGS. 3(a) and 3(b) represent a flowchart of a sequence of logical steps or a road parameter calculating program performed by the road parameter calculator 1. After entering the program, the routine proceeds to step S1 wherein the image acquiring unit 7 acquires an image of a forward view of the system-equipped vehicle using the camera 33.

The routine proceeds to step S2 wherein the edge-point extracting unit 9 works to detect or extract edge points from the image, as acquired in step 1. Each of the edge points, as referred to herein, is expressed by a dot or pixel whose difference in brightness level between itself and an adjacent pixel on the image is greater than a given level.

The routine proceeds to step S3 wherein from the edge points extracted in step 2, ones which have a higher probability that they arise from a lane line (which will also be referred to as a vehicle lane line) defining a lane on a road in which the system-equipped vehicle is now traveling is selected.

Specifically, the operation in step S3 is achieved in the following way. A Hough transform is performed on the edge points derived in step S2 to determine lane line candidates. From the lane line candidates, one which have a high probability that they represent the vehicle lane line are selected using positions and directions of the lane line candidates relative to the system-equipped vehicle. Ones of the edge points which correspond to the selected lane line candidate are derived.

The routine then proceeds to step S4 wherein the gradient detecting unit 13 works to determine a change in inclination or gradient of the road in front of the system-equipped vehicle (which will also be referred to below as a gradient change). The operation in step S4 will be described in detail with reference to FIG. 4. The gradient, as referred to in this disclosure, is a gradient of the road in a direction in which the system-equipped vehicle is moving forward. The gradient usually includes an ascending gradient or a descending gradient. The fact that there is the gradient change means that the gradient of the road in front of the system-equipped vehicle is different from that where the system-equipped vehicle now exists.

For example, the gradient change occurs in a case where the system-equipped vehicle now exists on a flat or horizontal surface of the road, and there is an uphill or a downhill in front the system-equipped vehicle. Alternatively, the gradient change may occur in a case where the system-equipped vehicle is currently located on an upward slope, and there is an upward slope with a greater gradient, a horizontal road, or a downward slope in front of the system-equipped vehicle. The gradient change may also occur in a case where the system-equipped vehicle is currently located on a downward slope, and there is a downward slope with a greater gradient, a horizontal road, or an upward slope in front of the system-equipped vehicle.

Figure 4:
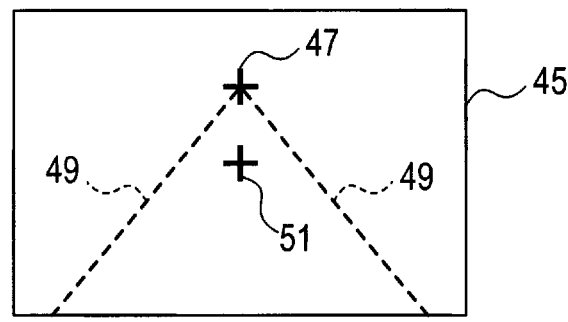
FIG. 4 is an explanatory view which shows how to detect a change in gradient of a road.

The gradient detecting unit 13 obtains the image 45, as illustrated in FIG. 4, using the camera 33. The gradient detecting unit 13 calculates the first vanishing point 47 on the image 45. The first vanishing point 47 is an intersection of the right and left vehicle lane lines 49 which are lines on the image 45 defining a lane on which the system-equipped vehicle is positioned.

The memory 5 stores the second vanishing point 51 in advance. The second vanishing point 51 is defined as being a vanishing point (i.e., an intersection of the right and left vehicle lane lines 49) when the system-equipped vehicle is moving on a flat and horizontal road surface. If the system-equipped vehicle travels at a long distance, the second vanishing point 51 may be updated in a learning mode.

The gradient detecting unit 13 continuously determines a positional relation between the first vanishing point 47 and the second vanishing point 51 in a vertical direction on the image 45.

The routine proceeds to step S5 wherein the gradient detecting unit 13 analyzes the vertical positional relation between the first vanishing point 47 and the second vanishing point 51, as derived in step S4, to determine whether there is the gradient change or not.

Specifically, if the first vanishing point 47 remains above or below the second vanishing point 51, it is determined that there is the gradient change. Alternatively, if the first vanishing point 47 coincides with the second vanishing point 51, it is determined that there is no gradient change. If the first vanishing point 47 moves above or below the second vanishing point 51 cyclically at a short interval, it is also determined that there is not gradient change. This is thought of as arising from pitching motion of the system-equipped vehicle. If a YES answer is obtained in step S5 meaning that there is the gradient change, then the routine proceeds to step S6. Alternatively, if a NO answer is obtained in step S5, then the routine proceeds to step S10.

In step S6, the modeling unit 15 produces a first model that is a model for use in calculating the road parameter using the edge points through a Kalman filter in step S17 which will be described later in detail. The first model is a model which is defined by an algorithm used in the Kalman filter and represents the configuration of a road. The first model is designed in terms of a road which extends more straight than the second model. This modeling may be achieved by decreasing the degree or order in a polynomial used in the Kalman filter in a way, as taught in US2016/0148059 A1, filed on Nov. 23, 2015, assigned to the same assignee as that of this application, disclosure of which is totally incorporated herein by reference.

The routine proceeds to step S7 wherein the response setting unit 17 works to set the response rate or responsiveness of the Kalman filter to be lower than that determined in step S11 which will be described later in detail. The responsiveness of the Kalman filter is a speed or rate of response of the Kalman filter to input of the edge points and used in calculating the road parameter in the following step S17. The lower the responsiveness of the Kalman filter, the greater an effect of the road parameter, as derived previously, on the road parameter, as calculated currently, thereby resulting in a decrease in change in the road parameter.

Figure 5:
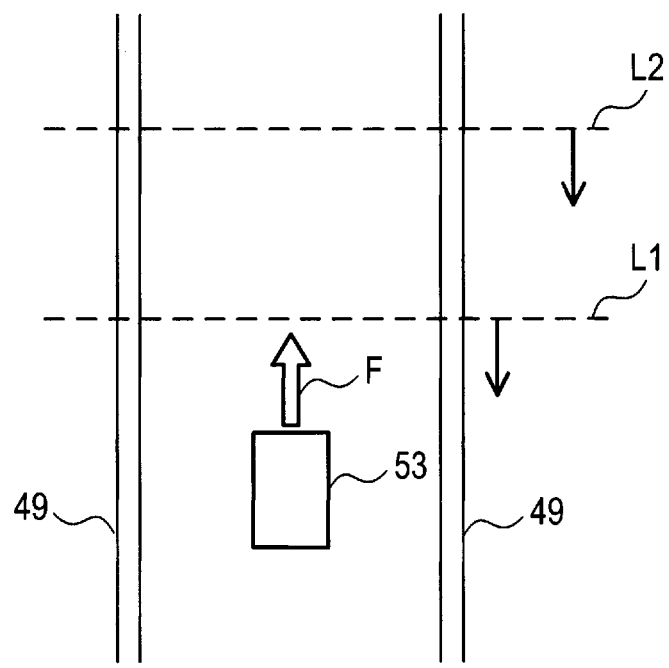
FIG. 5 is an explanatory view which shows how to set a range of edge points.

The routine proceeds to step S8 wherein the edge-point limiting unit 19 works to delimit a range of the edge points used in the following step S17. This operation will be described below using FIG. 5. FIG. 5 is a bird eye's view. "L1" and "L2" represent locations of lines defined in front of the system-equipped vehicle 53 in the traveling direction F thereof. The line L1 is located closer to the system-equipped vehicle 53 than the line L2 is.

The edge-point limiting unit 19 uses in the following step S17 ones of the edge points selected in step S3 which lie closer to the system-equipped vehicle than the line L1 does.

If a NO answer is obtained in step S5 meaning that there is no gradient change, so that the operation in step S8 is not executed, ones of the edge points selected in step S3 which lie closer to the system-equipped vehicle 53 than the line L2 does are used in the following step S17.

As apparent from the above discussion, when detecting the gradient change, the edge-point limiting unit 19 defines the range in which the edge points should be used in the following step S17 to be closer to the system-equipped vehicle 53 than when there is no gradient change.

Referring back to FIG. 3(a), after step S8, the routine proceeds to step S9 wherein the threshold determining unit 29 prepares the first threshold value. The first threshold value is used in the following step S15. The first threshold value is smaller than a second threshold value which will be described later in detail.

If a NO answer is obtained in step S5 meaning that there is no gradient change, then the routine proceeds to step S10 wherein the modeling unit 15 defines the second model that is a mode for use in calculating the road parameter using the edge points through the Kalman filter in the following step S17.

The routine proceeds to step S11 wherein the response setting unit 17 sets the value of the responsiveness (i.e., a response rate) of the Kalman filter to a normal value. The normal value is selected to be a higher response rate than that determined in step S7.

The routine proceeds to step S12 wherein the threshold determining unit 29 prepares the second threshold value. The second threshold value is used in the following step S15. The second threshold value is smaller than the first threshold value.

The routine proceeds to step S13 wherein the lane line producing unit 21 works to produce the vehicle lane line using the edge points. The edge points, as selected in step S3, are used in step S13. When the operation in step S8 is executed, ones of the edge points selected in step S3 which lie closer to the system-equipped vehicle than the line L1 does are used in step S13.

Figure 6:
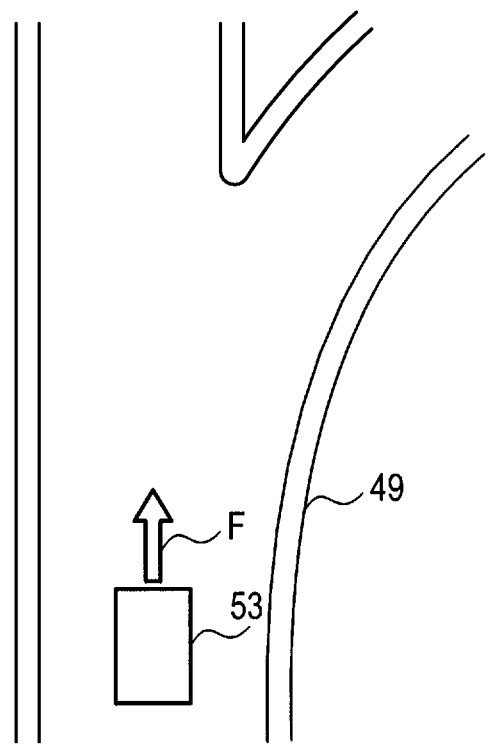
FIG. 6 is an explanatory view which shows how to determine whether there is a branch line.

The routine proceeds to step S14 wherein the likelihood calculating unit 23 calculates a likelihood that the vehicle lane line, as derived in step S13, is a branch line (i.e., a lane line of a branch road). The likelihood is calculated using at least one of a curvature of the vehicle lane line, a yaw angle, and an offset. The yaw angle is an angle which the traveling direction F of the system-equipped vehicle 53 illustrated in FIG. 6 makes with a longitudinal direction of the vehicle lane line 49. FIG. 6 is a bird's eye view. The offset is a distance between the system-equipped vehicle 53 and the vehicle lane line 49 (i.e., the right lane line in the example of FIG. 6) in the widthwise direction of the road.

Referring back to FIG. 3(b), after step S14, the routine proceeds to step S15 wherein the branch line determining unit 25 determines whether the likelihood, as calculated in step S14, is greater than a threshold value or not. The threshold value used in step S15 is the first threshold value when the operation in step S9 has been executed or the second threshold value when the operation in step S12 has been executed.

If a YES answer is obtained in step S15 meaning that the likelihood is greater than the threshold value, in other words, the vehicle lane line, as calculated in step S13, is the branch line, then the routine proceeds to step S16. Alternatively, if a NO answer is obtained meaning that the likelihood is less than or equal to the threshold value, in other words, the vehicle lane line, as calculated in step S13, is not the branch line, then the routine proceeds to step S17.

In step S16, the edge-point removing unit 27 excludes the edge points on the vehicle lane line, as determined as the branch line in step S15, from the edge points for use in the following step S17.

In step S17, the road parameter calculating unit 11 calculates the road parameter using the edge points through the Kalman filter. In other words, the edge points are inputted to the Kalman filter to derive the road parameter representing the configuration of the road. Basically, the edge points, as used in step S17, are the edge points selected in step S3. However, when the operation in step S8 has been executed, ones of the edge points selected in step S3 which lie in a range located closer to the system-equipped vehicle than the line L1 is are selected. Alternatively, when the operation in step S16 has been executed, from the edge points, ones which lie on the branch line are removed.

The model used in the Kalman filter is set to the first model when the operation in step S6 has been executed or the second model when the operation in step S10 has been executed.

The responsiveness or response rate of the Kalman filter is selected to be low when the operation in step S7 has been executed or to be normal when the operation in step S11 has been executed.

After step S17, the routine proceeds to step S18 wherein the output unit 31 outputs the road parameter, as calculated in step S17, to the driver-assistance system 43.

3 Effects of the Road Parameter Calculator

1A When the gradient change is detected, the road parameter calculator 1 uses the first model which is designed to model a road which is more straight, in other words, has a reduced curvature than when the gradient change is not detected. This minimizes the effect of the gradient change on calculation of the road parameter.

1B When the gradient change is detected, the road parameter calculator 1 changes the response rate of the Kalman filter to be slower than when the gradient change is not detected. This minimizes the effect of the gradient change on the calculation of the road parameter.

1C When there is the gradient change, the calculation of the road parameter using the edge points located far away from the system-equipped vehicle usually result in an increase in effect of the gradient change on the value of the road parameter. The road parameter calculator 1, therefore, works to delimit the range of the edge points for use in calculating the road parameter to be closer to the system-equipped vehicle when the gradient change is detected than when no gradient change is detected. This minimizes the adverse effect of the gradient change on the calculation of the road parameter.

1D The road parameter calculator 1 is also designed to change the threshold value for use in determining whether the vehicle lane line is the branch line or not when the gradient change is detected to be greater than when no gradient change is detected. This minimizes an error in determining that the vehicle lane line is the branch line when there is the gradient change, thereby ensuring the stability in calculating the road parameter correctly regardless of the gradient change.

1E The road parameter calculator 1 detects the gradient change using the vertical positional relation between the first vanishing point 47 and the second vanishing point 51, thereby facilitating the detection of the gradient change and enhancing the accuracy of such detection.

Modifications

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

(1) In step S6, when two vehicle lane lines: the right and left vehicle lane lines are being detected, a first model A may be selected. Alternatively, when only one of the vehicle lane lines is being detected, a first model B may be selected. The first model B is designed to model a road forward extending more straight, in other words, a road with a reduced curvature than the first model A. The first model A is designed to model a road extending more straight than the second model.

The selection of the model in the above way greatly decreases the effect of the gradient change on the calculation of the road parameter when there is the gradient change, and only one of the vehicle lane lines is being detected.

(2) The gradient detecting unit 13 also determines the degree of the gradient change as well as detection of the gradient change. Specifically, the gradient detecting unit 13 may also work as a degree-of-gradient calculating unit. In step S7, the response rate may be lowered with an increase in degree of the gradient change. This also enables the response rate of the Kalman filter as a function of the degree of the gradient change.

Figure 10:
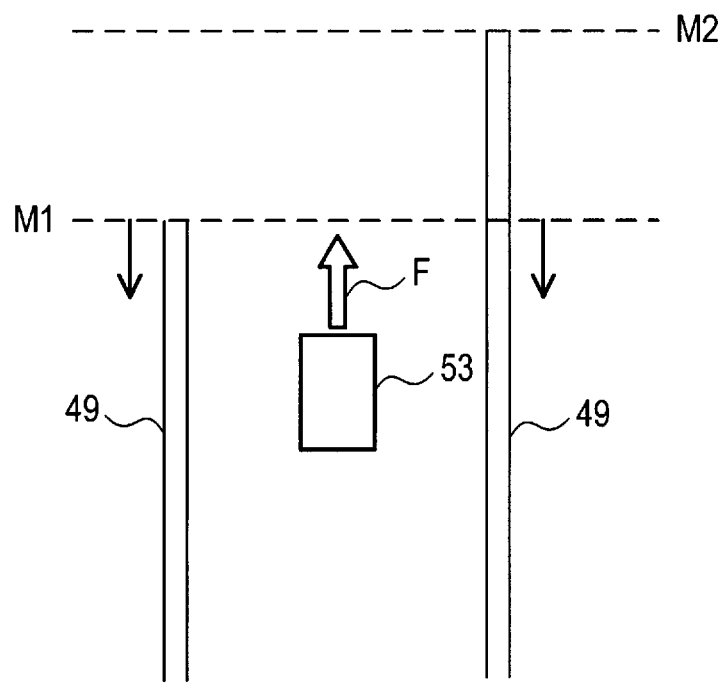
FIG. 10 is an explanatory view which shows how to set a range of edge points.

(3) In step S8, the edge points may be limited in the following way. FIG. 10 is a bird eye's view. In case of the left vehicle lane line 49, the edge points are detected to the location (i.e., a broken line) M1. In case of the right vehicle lane line 49, the edge points are detected to the location (i.e., a broken line) M2. The lines M1 and M2 are located in front of the system-equipped vehicle 53 in the traveling direction F. The line M1 is closer to the system-equipped vehicle 53 than the line M2 is.

The edge-point limiting unit 19 limits a right and a left range in which the edge points on the right and left vehicle lane lines 49 are used in step S17 to be closer to the system-equipped vehicle than the line M1 is. In other words, the edge-point limiting unit 19 sets the right and left ranges of the edge points on the right and left sides of the system-equipped vehicle for use in step S17 to be equal to each other.

The use of the edge points lying between the lines M1 and M2 on one of the right and left sides of the system-equipped vehicle results in a greater effect of the gradient change on the calculation of the road parameter. This problem is, therefore, alleviated by defining the ranges of the edge points on the right and left sides of the system-equipped vehicle for use in step S17 to be closer to the system-equipped vehicle than the line M1 is.

(4) In steps S4 and S5, the determination of whether there is the gradient change or not may be achieved in another way. For instance, the gradient change may be detected using a change in positional relation between a vehicle traveling ahead of the system-equipped vehicle and the vehicle lane line (either of the right or left vehicle lane line) in the width-wise direction of the road.

Figure 7:
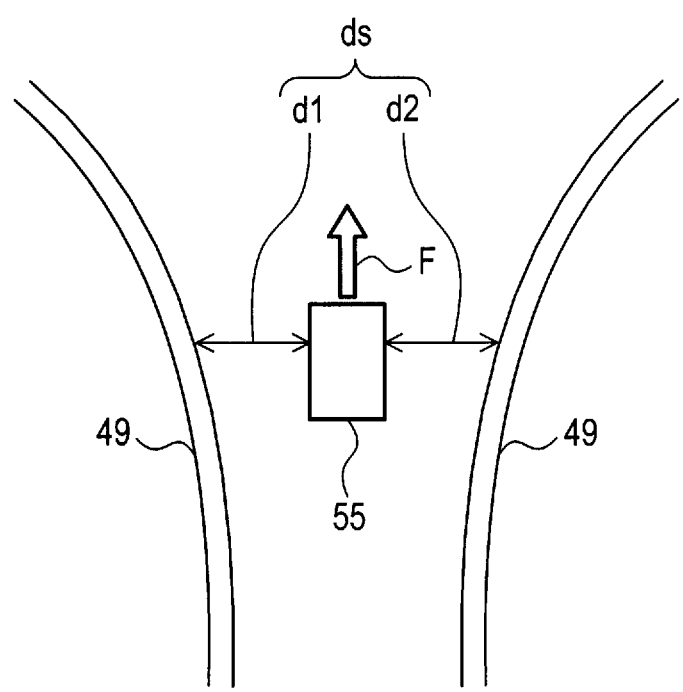
FIG. 7 is an explanatory view which shows how to detect a change in gradient of a road.

The vehicle lane lines 49 in FIG. 7 may be sometimes viewed on the image as branch lines. FIG. 7 is a bird eye's view into which an image captured by the camera 33 is converted. The distance between the preceding vehicle 55 and one of the vehicle lane lines 49 is expressed by d1. The distance between the preceding vehicle 55 and the other vehicle lane line 49 is expressed by d2. The sum of the distances d1 and d2 is expressed by ds. If the vehicle lane lines 49 are actually the branch lines, it will cause the distance ds to change with time. Alternatively, if the vehicle lane lines 49 are not actually the branch lines, in other words, look like as if they are the branch lines due to the gradient change, it will cause the distance ds to be kept constant.

Using the above conditions, when the vehicle lane lines 49 which look like the branch lines appear on the image, and the distance ds is kept constant with time, the gradient detecting unit 13 may determine that there is the gradient change. This method facilitates the detection of the gradient change with an increased accuracy.

(5) In steps 4 and 5, the determination of whether there is the gradient change or not may be achieved by using a positional relation between a locus or trace of a preceding vehicle and the vehicle lane line.

Figure 8:
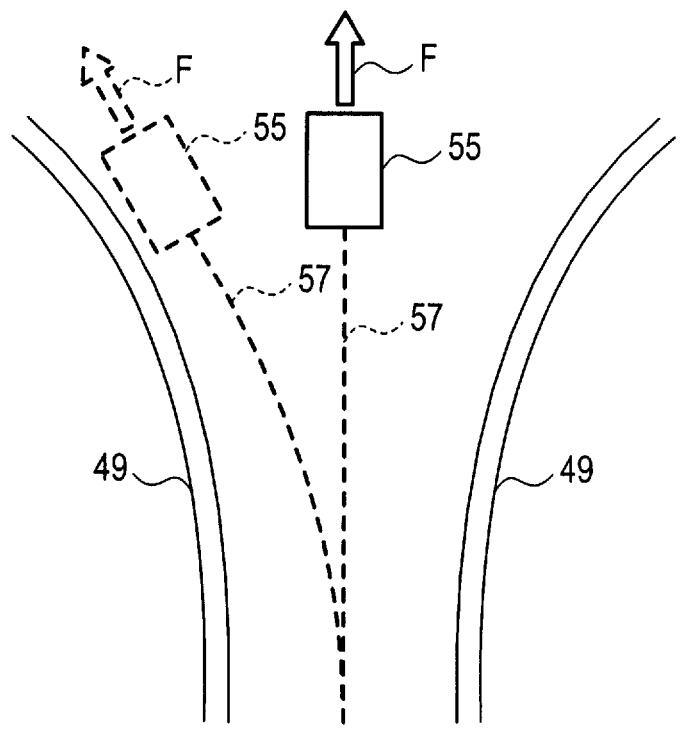
FIG. 8 is an explanatory view which shows how to detect a change in gradient of a road.

The vehicle lane lines 49 in FIG. 8 may be sometimes viewed on the image as branch lines. FIG. 8 is a bird eye's view into which an image captured by the camera 33 is converted. The trace of the preceding vehicle 55 traveling ahead of the system-equipped vehicle is expressed by a broken line 57. When the vehicle lane lines actually represent the branch lines, the trace 57 will extend along either one of the vehicle lane lines 49. Alternatively, when the vehicle lane lines are not actually the branch lines, in other words, look like as if they are the branch lines due to the gradient change, it will cause the trace 57 to lie at the middle between the right and left vehicle lane lines 49.

Using the above conditions, when the vehicle lane lines 49 which look like the branch lines appear on the image, and the trace 57 lies at the middle between the right and left vehicle lane lines 49, the gradient detecting unit 13 may determine that there is the gradient change. This method facilitates the detection of the gradient change with an increased accuracy.

(6) In steps S4 and S5, the determination of whether there is the gradient change or not may be achieved in another way. For instance, the gradient change may be detected using a combination of curvatures of the right and left vehicle lane lines.

Figure 9:
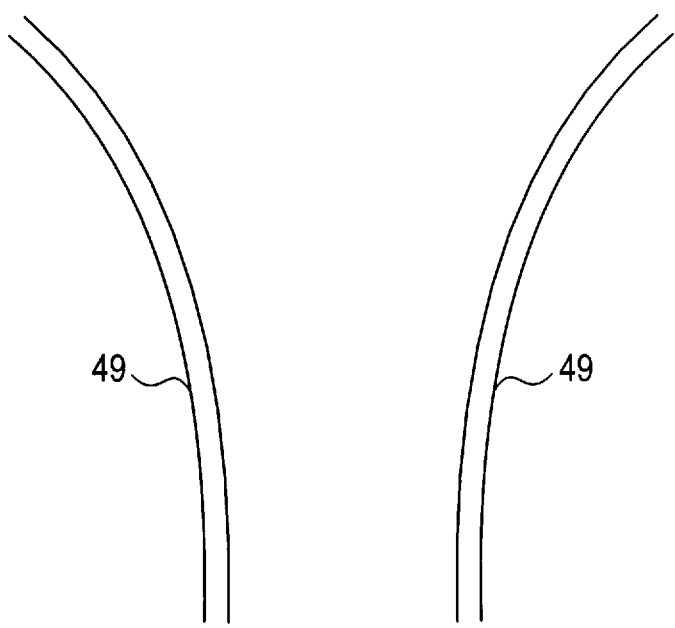
FIG. 9 is an explanatory view which shows how to detect a change in gradient of a road.

Specifically, when there is the gradient change, the apparent curvatures (i.e., orientation of curves) of the right and left vehicle lane lines 49 on the image are, as can be seen in FIG. 9, usually opposite each other. FIG. 9 is a bird eye's view into which an image captured by the camera 33 is converted. In the example of FIG. 9, the right vehicle lane line 49 is curved in the right direction, while the left vehicle lane line 49 is curved in the left direction.

Based on the above fact, when the apparent curvatures of the right and left vehicle lane lines 49 on the image are opposite each other, the gradient detecting unit 13 determines that there is the gradient change. This method facilitates the detection of the gradient change with an increased accuracy.

(7) The determination of whether there is the gradient change or not in steps S4 and S5 may also be achieved in another way. For instance, the gradient change may be detected using information about gradients of roads recorded in a map. Specifically, the gradient detecting unit 13 may acquire the current location of the system-equipped vehicle using the navigation system 39, read gradients at the location of the system-equipped vehicle and at a given location in front of the system-equipped vehicle out of the map information storage 41, and then compare the gradients read out of the map information storage 41 to determine whether there is the gradient change or not. This method also facilitates the detection of the gradient change with an increased accuracy.

(8) The determination of whether there is the gradient change or not in steps S4 and S5 may also be achieved in another way. For instance, the gradient detecting unit 13 may obtain the configuration of a surface of a road in front of the system-equipped vehicle using the surroundings sensor 35 and analyze it to determine whether there is the gradient change or not. This method also facilitates the detection of the gradient change with increased accuracy.

(9) In the above embodiment, a plurality of functions of one of the components of the road parameter calculator 1 may be shared with two or more of the components. A single function of one of the components may be achieved by two or more of the other components. Alternatively, two or more functions of two of more of the components may be performed by only one of the components. A single function performed by two or more of the components may be achieved by one of the components. The components of the above embodiment may be partially omitted.

(10) The above described road parameter calculator 1 may be achieved in one of various modes: a system equipped with the road parameter calculator 1, a logical program executed by a computer which realizes the road parameter calculator 1, a non-transitory tangible storage medium, such as a semiconductor memory, which stores the program, and a road parameter calculating method.

What is claimed is:

1. A road parameter calculator comprising:
an image acquiring unit which is configured to acquire an image of a forward view of a vehicle;
an edge-point extracting unit which is configured to extract edge points from the image derived by the image acquiring unit;
a road parameter calculating unit which is configured to calculate a road parameter through a Kalman filter using the edge points derived by the edge-point extracting unit, the road parameter representing a configuration of a road in front of the vehicle;
a gradient detecting unit which is configured to detect a change in gradient of the road in front of the vehicle; and
a modeling unit which is configured to produce a model used in the Kalman filter, when the gradient detecting unit detects the change in gradient of the road, the modeling unit working to produce a model of the road in which a curvature of the road is reduced than when the change in gradient of the road is not detected.

2. A road parameter calculator as set forth in claim 1, wherein when the gradient detecting unit detects the change in gradient, and only one of a right lane line and a left lane line is detected, the modeling unit works to produce the model designed to model the road in which the curvature of the road is reduced further than that when the gradient detecting unit detects the change in gradient, and the right and left lane lines are both detected, the right and left lane lines being lines on the image which define a road on which the vehicle is currently located.

3. A road parameter calculator as set forth in claim 1, further comprising a response setting unit which sets a response rate of the Kalman filter, and wherein when the gradient detecting unit detects the change in gradient, the response setting unit sets the response rate of the Kalman filter to be lower than that when the gradient detecting unit detects no change in gradient.

4. A road parameter calculator as set forth in claim 3, further comprising a degree-of-gradient calculating unit which is configured to calculate a degree of the change in gradient, and wherein the response setting unit lowers the response rate with an increase in degree of the change in gradient, as calculated by the degree-of-gradient calculating unit.

5. A road parameter calculator as set forth in claim 1, wherein when a first vanishing point remains above or below a second vanishing point, said gradient detecting unit determines that there is the change in gradient, the first vanishing point being an intersection of a right lane line and a left lane line, the right and left lane lines being lines on the image which define a lane on which the vehicle now exist, the second vanishing point being an intersection of the right and left lane lines when the vehicle is moving on a flat and horizontal road surface.

6. A road parameter calculator as set forth in claim 1, wherein the gradient detecting unit detects the change in gradient using a sensor which is capable of measuring a configuration of a surface of the road.

7. A road parameter calculator as set forth in claim 1, wherein the gradient detecting unit detects the change in gradient using a change in positional relation between a preceding vehicle and a lane line in a width-wise direction of the vehicle or a positional relation between a locus of the preceding vehicle and the lane line.

8. A road parameter calculator as set forth in claim 1, wherein the gradient detecting unit detects the change in gradient using a combination of curvatures of a right and a left lane line which are lines on the image defining a road on which the vehicle is currently located.

9. A road parameter calculator as set forth in claim 1, wherein the gradient detecting unit detects the change in gradient using information about gradients of roads recorded in a map.

10. A road parameter calculator comprising:
an image acquiring unit which is configured to acquire an image of a forward view of a vehicle;
an edge-point extracting unit which is configured to extract edge points from the image derived by the image acquiring unit;
a road parameter calculating unit which is configured to calculate a road parameter through a Kalman filter using the edge points derived by the edge-point extracting unit, the road parameter representing a configuration of a road in front of the vehicle;
a gradient detecting unit which is configured to detect a change in gradient of the road in front of the vehicle; and
an edge-point limiting unit which is configured to define a range in which the edge points are used by the road parameter calculating unit to lie closer to the vehicle when the gradient detecting unit detects the change in gradient than when the gradient detecting unit does not detect the change in gradient.

11. A road parameter calculator as set forth in claim 10, wherein when a first vanishing point remains above or below a second vanishing point, said gradient detecting unit determines that there is the change in gradient, the first vanishing point being an intersection of a right lane line and a left lane line, the right and left lane lines being lines on the image which define a lane on which the vehicle now exist, the second vanishing point being an intersection of the right and left lane lines when the vehicle is moving on a flat and horizontal road surface.

12. A road parameter calculator as set forth in claim 10, wherein the gradient detecting unit detects the change in gradient using a sensor which is capable of measuring a configuration of a surface of the road.

13. A road parameter calculator as set forth in claim 10, wherein the gradient detecting unit detects the change in gradient using a change in positional relation between a preceding vehicle and a lane line in a width-wise direction of the vehicle or a positional relation between a locus of the preceding vehicle and the lane line.

14. A road parameter calculator as set forth in claim 10, wherein the gradient detecting unit detects the change in gradient using a combination of curvatures of a right and a left lane line which are lines on the image defining a road on which the vehicle now exists.

15. A road parameter calculator as set forth in claim 10, wherein the gradient detecting unit detects the change in gradient using information about gradients of roads recorded in a map.

16. A road parameter calculator comprising:
an image acquiring unit which is configured to acquire an image of a forward view of a vehicle;
an edge-point extracting unit which is configured to extract edge points from the image derived by the image acquiring unit;
a road parameter calculating unit which is configured to calculate a road parameter through a Kalman filter using the edge points derived by the edge-point extracting unit, the road parameter representing a configuration of a road in front of the vehicle;

a gradient detecting unit which is configured to detect a change in gradient of the road in front of the vehicle; and an edge-point limiting unit which is configured to define a right range and a left range in which the edge points on a right lane line and a left lane line are used by the road parameter calculating unit, the right and left lane lines being lines on the image which define a road on which the vehicle now exists, when the gradient detecting unit detects the change in gradient, the edge-point limiting unit setting the right and left ranges to be equal to each other.

17. A road parameter calculator as set forth in claim 16, wherein when a first vanishing point is continuously kept above or below a second vanishing point, said gradient detecting unit determines that there is the change in gradient, the first vanishing point being an intersection of a right lane line and a left lane line, the right and left lane lines being lines on the image which define a lane on which the vehicle now exist, the second vanishing point being an intersection of the right and left lane lines when the vehicle is moving on a flat and horizontal road surface.

18. A road parameter calculator as set forth in claim 16, wherein the gradient detecting unit detects the change in gradient using a sensor which is capable of measuring a configuration of a surface of the road.

19. A road parameter calculator as set forth in claim 16, wherein the gradient detecting unit detects the change in gradient using a change in positional relation between a preceding vehicle and lane line in a width-wise direction of the vehicle or a positional relation between a locus of the preceding vehicle and the lane line.

20. A road parameter calculator as set forth in claim 16, wherein the gradient detecting unit detects the change in gradient using a combination of curvatures of a right and a left lane line which are lines on the image defining a road on which the vehicle is currently located.

21. A road parameter calculator as set forth in claim 16, wherein the gradient detecting unit detects the change in gradient using information about gradients of roads recorded in a map.

22. A road parameter calculator comprising:
an image acquiring unit which is configured to acquire an image of a forward view of a vehicle;
an edge-point extracting unit which is configured to extract edge points from the image derived by the image acquiring unit;
a road parameter calculating unit which is configured to calculate a road parameter through a Kalman filter using the edge points derived by the edge-point extracting unit, the road parameter representing a configuration of a road in front of the vehicle;
a gradient detecting unit which is configured to detect a change in gradient of the road in front of the vehicle;
a lane line producing unit which is configured to produce a lane line using the edge points derived by the edge-point extracting unit;
a likelihood calculating unit which is configured to calculate a likelihood that the lane line, as derived by the lane line producing unit, is a branch line using at least one of a curvature, a yaw angle, and an offset between the vehicle and the lane line;
a branch line determining unit which is configured to determine that the lane line represents the branch line when the likelihood, as derived by the likelihood calculating unit, is greater than a threshold value;
an edge-point removing unit which is configured to remove ones of the edge points which define the lane line, as determined by the branch line determining unit as being the branch line, from a range in which the edge points are used by the road parameter calculating unit; and
a threshold determining unit which is configured to increase the threshold used when the gradient detecting unit detects the change in gradient to be greater than that when the gradient detecting unit does not detect the change in gradient.

23. A road parameter calculator as set forth in claim 22, wherein when a first vanishing point remains above or below a second vanishing point, said gradient detecting unit determines that there is the change in gradient, the first vanishing point being an intersection of a right lane line and a left lane line, the right and left lane lines being lines on the image which define a lane on which the vehicle is currently located, the second vanishing point being an intersection of the right and left lane lines when the vehicle is moving on a flat and horizontal road surface.

24. A road parameter calculator as set forth in claim 22, wherein the gradient detecting unit detects the change in gradient using a sensor which is capable of measuring a configuration of a surface of the road.

25. A road parameter calculator as set forth in claim 22, wherein the gradient detecting unit detects the change in gradient using a change in positional relation between a preceding vehicle and a lane line in a width-wise direction of the vehicle or a positional relation between a locus of the preceding vehicle and the lane line.

26. A road parameter calculator as set forth in claim 22, wherein the gradient detecting unit detects the change in gradient using a combination of curvatures of a right and a left lane line which are lines on the image defining a road on which the vehicle is currently located.

27. A road parameter calculator as set forth in claim 22, wherein the gradient detecting unit detects the change in gradient using information about gradients of roads recorded in a map.

* * * * *